US011086822B1

(12) United States Patent
Kraus

(10) Patent No.: US 11,086,822 B1
(45) Date of Patent: Aug. 10, 2021

(54) APPLICATION-BASED COMPRESSION

(71) Applicant: Amazon Technologies, Inc., Seattle, WA (US)

(72) Inventor: Holger Kraus, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 935 days.

(21) Appl. No.: 15/264,368

(22) Filed: Sep. 13, 2016

(51) Int. Cl.
 *G06F 16/174* (2019.01)
 *G06F 16/23* (2019.01)
 *H04L 29/08* (2006.01)

(52) U.S. Cl.
 CPC ...... *G06F 16/1744* (2019.01); *G06F 16/2365* (2019.01); *H04L 67/2828* (2013.01)

(58) Field of Classification Search
 CPC . G06F 16/2365; G06F 3/0638; G06F 16/1752
 See application file for complete search history.

(56) References Cited

U.S. PATENT DOCUMENTS

| 6,199,126 | B1 * | 3/2001 | Auerbach | ........... | G06F 9/30178 710/68 |
| 2002/0029206 | A1 * | 3/2002 | Satoh | .................. | H03M 7/3084 |
| 2009/0187673 | A1 * | 7/2009 | Ramjee | ............... | H04L 67/2828 709/247 |
| 2011/0307470 | A1 * | 12/2011 | Kamimura | .............. | G06F 16/27 707/713 |
| 2013/0326170 | A1 * | 12/2013 | Kilari | ............... | G11B 20/00007 711/161 |
| 2016/0080400 | A1 * | 3/2016 | Sim | ..................... | H04L 63/1416 726/23 |

* cited by examiner

*Primary Examiner* — Irete F Ehichioya
*Assistant Examiner* — Ken Hoang
(74) *Attorney, Agent, or Firm* — Knobbe Martens Olson & Bear LLP

(57) ABSTRACT

A communication system and methods for data compression and the management of data transmitted between computing devices in a communication network are provided. Compression dictionaries generated from data previously maintained at a recipient computing device and a transmitting computing device are maintained at each respective device. The compression dictionaries are made up of fixed length data chunks from the data previously maintained on the computing device that can be matched to data to be compressed or de-compressed. Data can be transmitted without requiring the exchange of the compression dictionaries between the recipient computing device and the transmitting computing device.

20 Claims, 12 Drawing Sheets

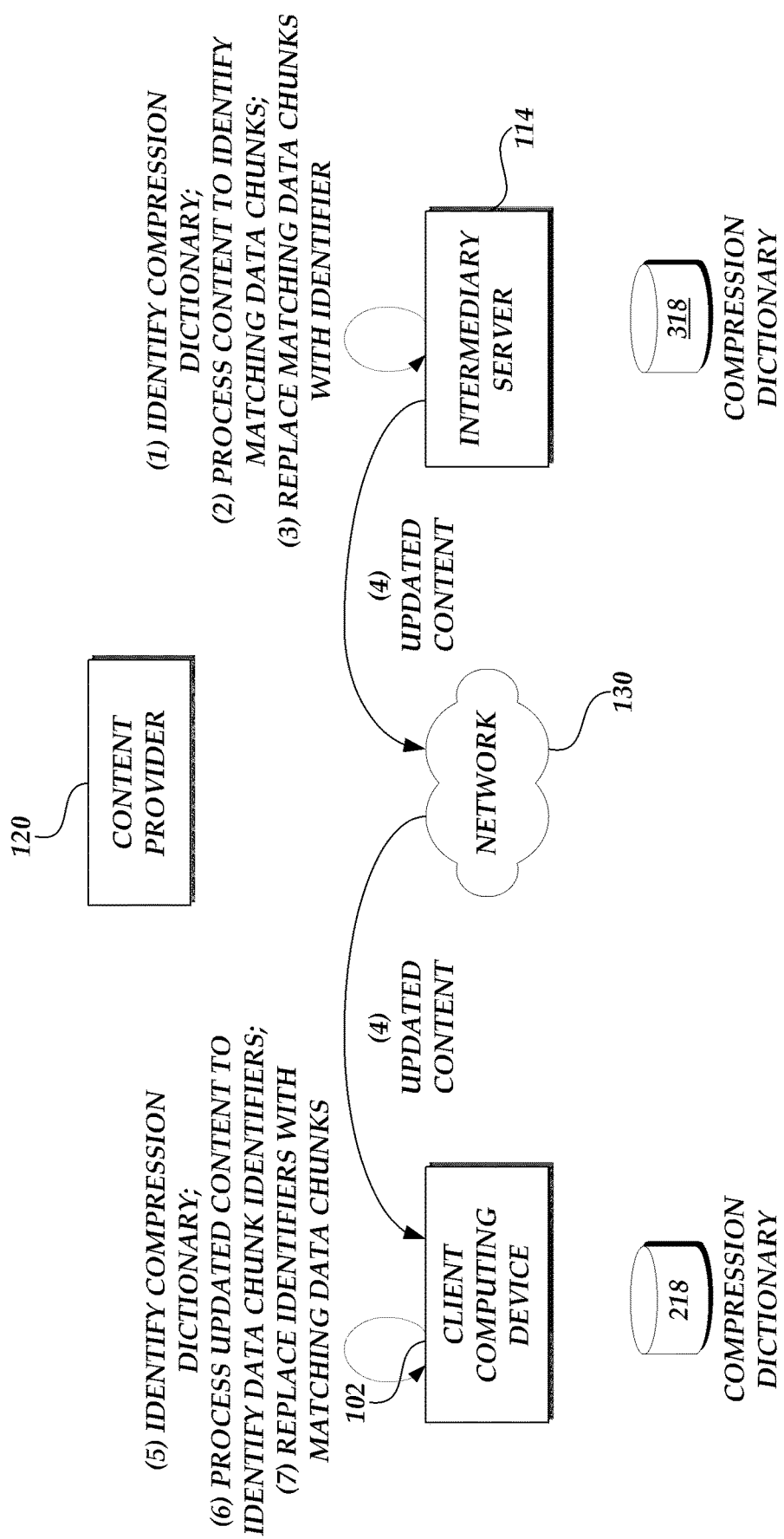

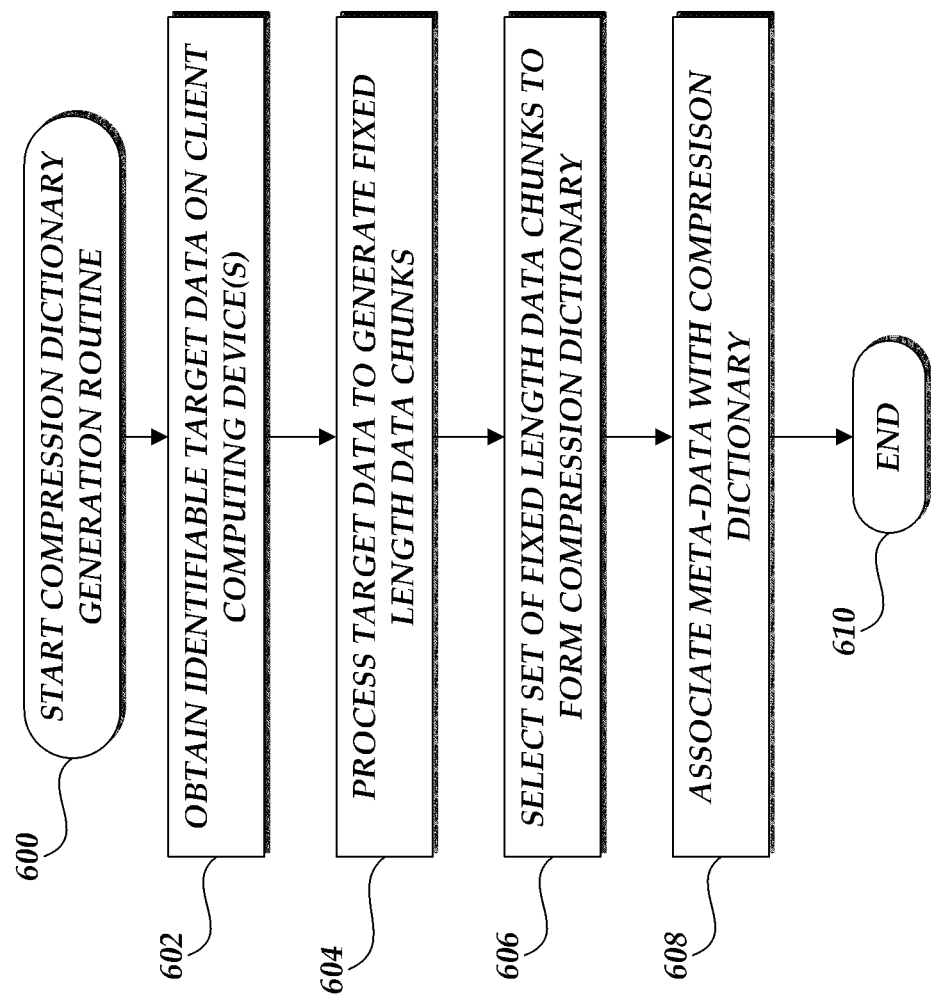

APPLICATION-BASED COMPRESSION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing machine to host one or more instances of virtual machines that appear and operate as independent computer machines to a connected computer user. With virtualization, a single physical computing device can create, maintain, or delete virtual machines in a dynamic manner. In turn, users can request computer resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some environments, limiting the amount of data transmitted between client computing devices and data center resources can improve perceived performance of the client computing devices and the network resources. Additionally, limiting the amount of data transmitted to the client computing device can have financial impacts for users of the client computing devices and network service providers in embodiments in which the amount of data transmitted over a communication network or communication networks is associated with financial costs.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 4B is a block diagram of the communication management environment of FIG. 1 illustrating the interaction between the illustrated components for generating and processing compressed data in accordance with compression dictionaries;

FIG. 6 is a flow diagram illustrative of a compression dictionary generation routine implemented by various components of the communication management system;

DETAILED DESCRIPTION

Figure 1:
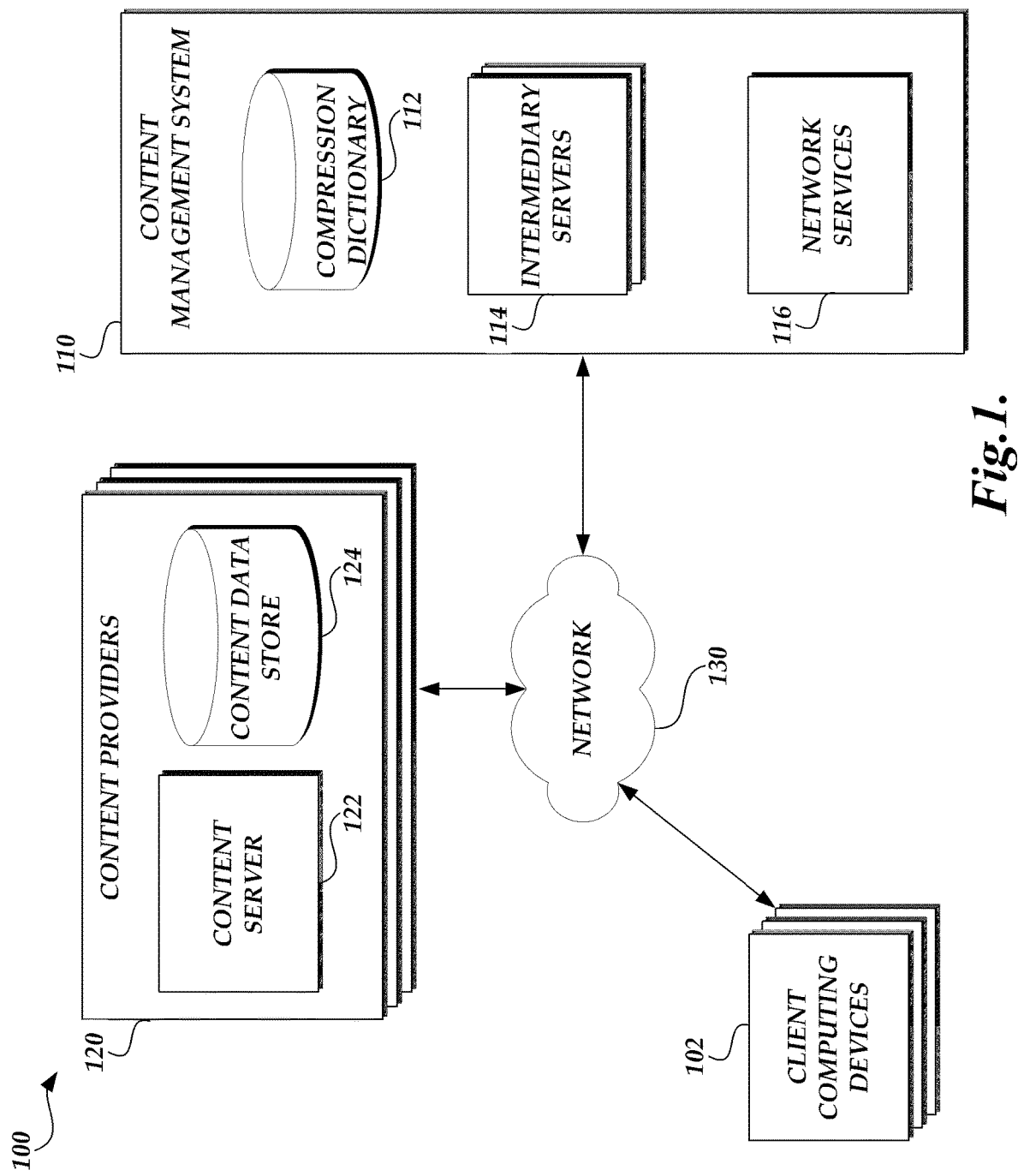
FIG. 1 is a block diagram of a communication management environment that includes one or more client devices, one or more content providers and a content management system according to one embodiment.

Generally described, the present application corresponds to data compression and the management of data transmitted between computing devices in a communication network. More specifically, aspects of the present application correspond to the utilization of compression dictionaries generated from data previously maintained at a recipient computing device and a transmitting computing device. Illustratively, the compression dictionaries are made up of fixed length data chunks from the data previously maintained on the computing device that can be matched to data to be compressed or de-compressed. A transmitting computing device can then process data to be exchanged to replace matching data chunks with identifiers from the compression dictionary. The resulting processed data can be transmitted without requiring the exchange of the compression dictionaries between the recipient computing device and the transmitting computing device.

With reference to an illustrative example, one or more client computing devices are in communication with a service provider that provides one or more intermediary servers. The intermediary servers facilitate interaction with other computing devices provided by the service provider or other third parties, including network resources such as Web pages, network-based services, and the like. The client computing device maintains executable code or other information that is utilized by the client computing device for various functions. The executable code can correspond to operating system executable code, software application executable code, scripting language, and the like. At least some portion of such executable code can be characterized or organized into fixed length data chunks. Additionally, the intermediary server computing device maintains or has access to the same executable code maintained by the client computing devices.

The client computing device and intermediary server establish a communication session and begin exchanging various forms of data. In some embodiments, multiple client computing devices can establish communication sessions. Either prior to the establishment of communications or responsive to the establishment of communications, both the client computing device and the intermediary server can generate or otherwise obtain one or more compression dictionaries formed from the data already on the client computing and accessible by the intermediary computing device. For data transmissions to the client computing device, regardless of the origin of data to be transmitted to the client computing device, the intermediary server can process the data to be transmitted by comparing and matching the data to be transmitted with the fixed length data blocks of the compression dictionary. The intermediary server can then update the data by substituting a matched fixed length data block with a corresponding identifier from the compression dictionary. For data transmission to the intermediary device, the client computing device can process the data to be transmitted by comparing and matching the data to be transmitted with the fixed length data blocks of the compression dictionary. The client computing device can then update the data by substituting a matched fixed length data block with a corresponding identifier from the compression dictionary.

Upon receipt of data compressed in accordance with the generated compression dictionary devices, the receiving device (either the client computing or intermediary computing device), can process the compressed data to locate the fixed length data chunk identifiers. The receiving device then adds the corresponding fixed length data blocks from the compression dictionary based on the matching identifier.

Illustratively, the compression dictionaries generated by the client computing devices are based on the executable code maintained on the client computing device and do not necessarily have any relation with the subsequent data being transmitted to the client computing device. In some embodiments, multiple compression dictionaries may be formed based on multiple parts of executable code or on different executable code. Additionally, the compression dictionaries can be associated with meta-data that facilitates utilization of particular compression dictionaries based on a type of data, source of data, and the like.

Although aspects of some embodiments described in the disclosure will focus, for the purpose of illustration, on the processing of specific network configuration information, such as the exchange of specific types of data or utilization of specific data to generate the compression dictionaries, one skilled in the relevant art will appreciate that the examples are illustrative only and are not intended to be limiting.

FIG. 1 is a block diagram depicting an illustrative logical network 100 including multiple client computing devices 102 and multiple content providers 120 in communication with a content management system 110 via a network 130. While the client computing devices 102 and the content providers 120 are shown as a group within FIG. 1, the client computing devices 102 and content providers 120 may be geographically distant, and independently owned or operated. For example, the client computing devices 102 could represent a multitude of users in various global, continental, or regional locations accessing the content parsing system 110. Further, the content providers 120 could represent a multitude of related or distinct parties that provide content, such as web sites, or other network-deliverable content to the client computing devices 102. Accordingly, the groupings of client computing devices 102 and content providers 120 within FIG. 1 is intended to represent a logical, rather than physical, grouping. Similarly, while one set of illustrative components is shown to represent the content management system 110, multiple instances of each component may be present within the content management system 110, and such components may be located within geographically diverse areas (e.g., globally, continentally, or regionally), in order to provide a wide geographical presence for the content management system 110.

Network 130 may be any wired network, wireless network, or combination thereof. In addition, the network 130 may be a personal area network, local area network, wide area network, cable network, satellite network, cellular telephone network, or combination thereof. In the example environment of FIG. 1, network 130 is a global area network (GAN), such as the Internet. Protocols and components for communicating via the other aforementioned types of communication networks are well known to those skilled in the art of computer communications and thus, need not be described in more detail herein. While each of the client computing devices 102, content providers 120, and content management system 110 is depicted as having a single connection to the network 130, individual components of the client computing devices 102, content providers 120, and content parsing system 110 may be connected to the network 130 at disparate points. Accordingly, communication times and capabilities may vary between the components of FIG. 1. In one embodiment, the content parsing system 110 may connect to the network 130 via one or more preferred communication channels, such that the communication times and capabilities of the content parsing system are expected to generally exceed those of client computing devices 102. For example, where the network 130 is the Internet, the content management system 110 may represent a "tier 1 network" with access to high-capacity data routes (e.g., "backbone routes") on the Internet. Such preferred communication channels can enable the content management system 110 to retrieve content items from content providers 120 and deliver the content items to client computing devices 102 with little or no perceivable delay versus direct transmission of the content items from content providers 120 to the client computing devices 102.

Client computing devices 102 may include any number of different computing devices capable of communicating with the content parsing system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may include one or more data stores (not shown in FIG. 1) including various applications or computer-executable instructions, such as web browsers, used to implement the embodiments disclosed herein. On an individual basis, client computing devices 102 may generally have access to fewer computing resources (e.g., processing power, memory, persistent storage space, electronic power, network communication capabilities, etc.) than the content management system 110. Illustrative components of a client computing device 102 will be described with regard to FIG. 2.

Content providers 120 may include any computing systems configured to delivery content items, such as web pages, to client computing devices 102 over the network 130. In embodiments where the network 130 is the Internet, content providers 120 may make content items available via one or more URLs, from which client computing devices 102 may retrieve the content items. Accordingly, each content provider 120 may include a content data store 124 in which to store the content items (e.g., HTML, XML, XHTML, or CSS documents, as well as associated text, images, videos, applications, executable code or other data referenced in such documents). Each content provider 120 may further include a content service 122 (e.g., a "web server") configured to receive requests for content items, and to return such content items to a requesting device. The operation of content servers is known within the art, and therefore will not be described in detail herein. Content providers 120 are illustratively shown in FIG. 1 as distinct from the content management system 110. However, in some embodiments, the content management system 110 may associated with one or more content providers 120, and thus the one or more content providers 120 and the content management system 110 may be integrated into a single system.

In accordance with embodiments, the content management system 110 includes one or more intermediary servers 114, one or more network services 116, and a compression dictionary data store 112. As described in further detail below, the intermediary servers 114 can receive request from client computing devices 102 for content items provided by a content provider 120 or network services 116, and return the content item to the client computing device 102. As such, in some aspects the intermediary servers 114 may operate similarly to a proxy server, such that requests from the client computing device 102 for content items provide by the content providers 120 and network services 116 are initially routed to the intermediary servers 114, rather than to the content providers 120 or the network services 116. In other aspects, the intermediary servers 114 may independent transmit requests to the content provider 120 and network services 116 in response to the request received by the client computing devices. In this capacity the intermediary servers 114 is not simply functioning as a proxy, but independently manages content requests. Illustrative components of an intermediary server 114 will be described with regard to FIG. 3. Additionally, as will be explained in greater detail below, the intermediary servers 114 can further utilize compression dictionaries to generate compressed content that is transmitted to and from the client computing devices 102.

It will be appreciated by those skilled in the art that the content management system 110 may have fewer or greater components than are illustrated in FIG. 1. Thus, the depiction of the content parsing system 110 in FIG. 1 should be taken as illustrative. For example, in some embodiments, components of the content management system 110, such as the intermediary servers 114, may be executed by one or more virtual machines implemented in a hosted computing environment. A hosted computing environment may include one or more rapidly provisioned and released computing resources, which computing resources may include computing, networking or storage devices. A hosted computing environment may also be referred to as a cloud computing environment. Additionally, one or more network services 116 may be maintained by third-party service provider and could be considered independent of the content management system 110.

Figure 2:
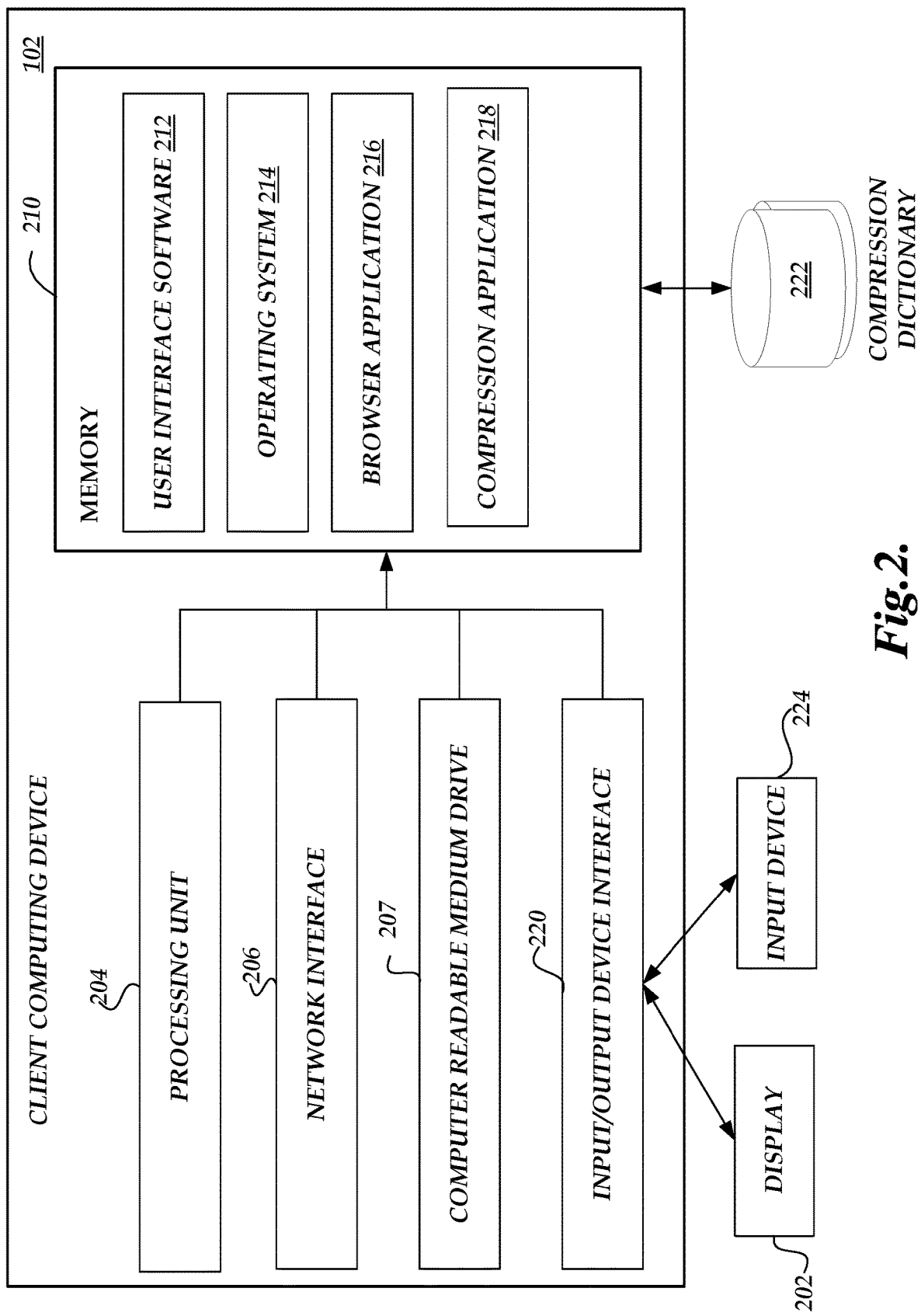
FIG. 2 is a block diagram of illustrative components of a client computing device configured to process content with a compression dictionary in accordance with an illustrative embodiment.

FIG. 2 depicts one embodiment of an architecture of an illustrative client computing device 102 that can generate and process content compressed in accordance with the present application. The general architecture of the client computing device 102 depicted in FIG. 2 includes an arrangement of computer hardware and software components that may be used to implement aspects of the present disclosure. As illustrated, the client computing device 102 includes a processing unit 204, a network interface 206, a computer readable medium drive 207, an input/output device interface 220, an optional display 202, and an input device 224, all of which may communicate with one another by way of a communication bus.

The network interface 206 may provide connectivity to one or more networks or computing systems, such as the network 130 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the client 102 may include more (or fewer) components than those shown in FIG. 2. For example, some embodiments of the client computing device 102 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the client 102. The memory 210 may further include computer program instructions and other information for implementing aspects of the present disclosure. For example, in one embodiment, the memory 210 includes a browser application 216 for access content from content providers 120 and network service providers 116 via an intermediate server 114. The memory 210 may further include a compression application 218 to de-compress data transmitted to the client computing device 102. In addition, the memory 210 may include or communicate with one or more auxiliary data stores, such as a local data compression dictionary data store 222.

Figure 3:
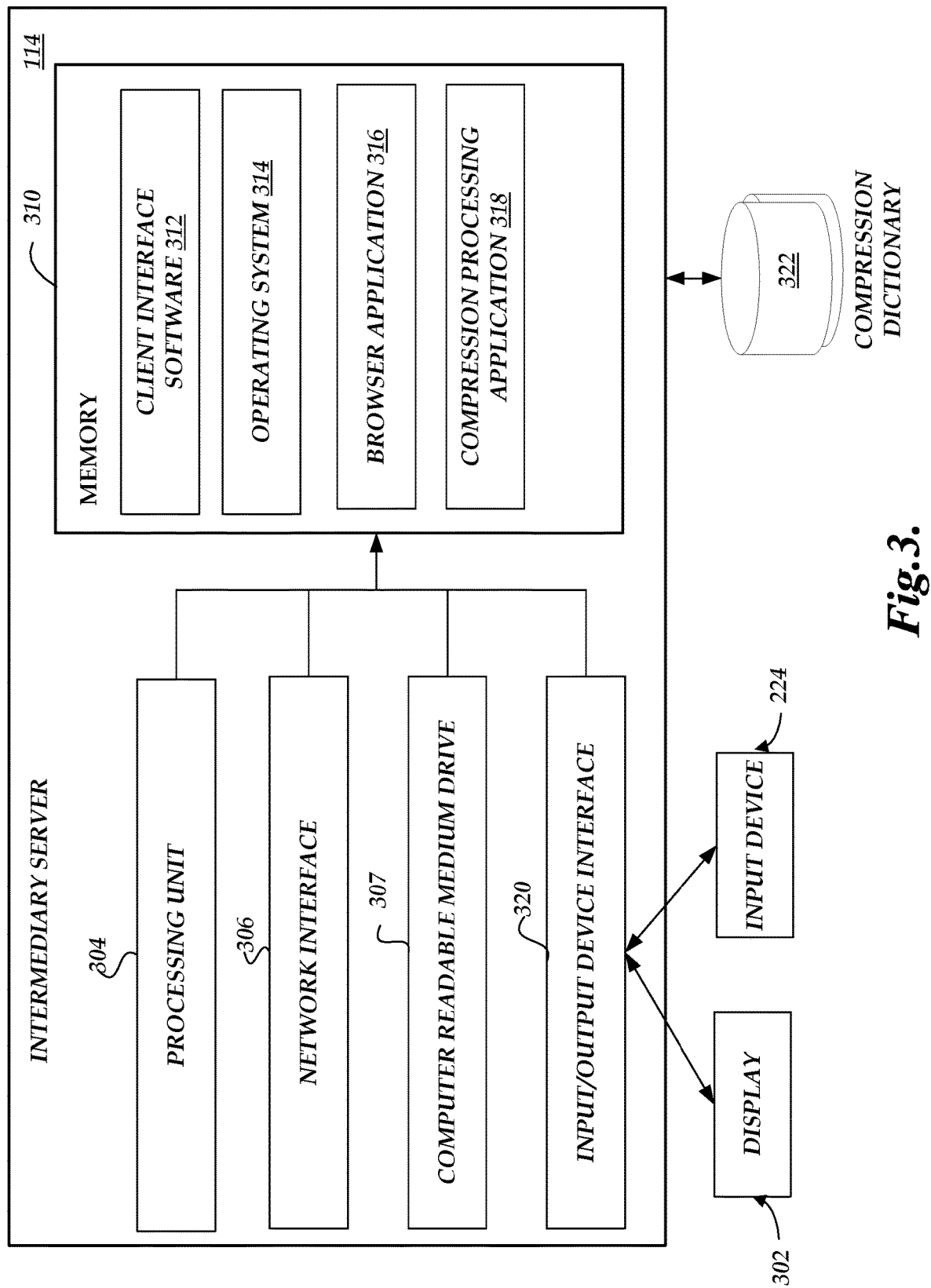
FIG. 3 is a block diagram of illustrative components of an intermediary server computing device configured to process content with a compression dictionary in accordance with an illustrative embodiment.

FIG. 3 depicts one embodiment of an architecture of an illustrative intermediary server 114 component that may implement data compression routines described herein. The general architecture of the intermediary server 114 depicted in FIG. 3 includes an arrangement of computer hardware and software components that may be used to implement aspects of the present disclosure. As illustrated, the intermediary server 114 includes a processing unit 304, a network interface 306, a computer readable medium drive 307, an input/output device interface 320, an optional display 302, and an input device 324, all of which may communicate with one another by way of a communication bus. The components of the intermediary server 114 may be physical hardware components or implemented in a virtualized environment.

The network interface 306 may provide connectivity to one or more networks or computing systems, such as the network 130 of FIG. 1. The processing unit 304 may thus receive information and instructions from other computing systems or services via a network. The processing unit 304 may also communicate to and from the memory 310 and further provide output information for an optional display 302 via the input/output device interface 320. The input/output device interface 320 may also accept input from the optional input device 324, which may be a keyboard, mouse, digital pen, etc. In some embodiments, the intermediary server 114 may include more (or fewer) components than those shown in FIG. 2. For example, some embodiments of the intermediary server 114 may omit the display 202 and input device 224, and instead provide input/output capabilities through one or more alternative communication channels (e.g., via the network interface 306).

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the intermediary server 114. The memory 310 may further include computer program instructions and other information for implementing aspects of the present disclosure. For example, in one embodiment, the memory 310 includes client interface software 312 for receiving and processing content requests from client devices 102. Additionally, the intermediary server 114 can include a browser application 316 that also facilitates interaction, on behalf of the client computing device 102, with content providers 120 and network services 116. The memory 310 includes a compression processing application 318 utilized by the intermediary server 114 to compress data to be transmitted to the client computing device 102. In addition, memory 210 may include or communicate with one or more auxiliary data stores, such as a local data compression dictionary data store 322.

Figure 4A:
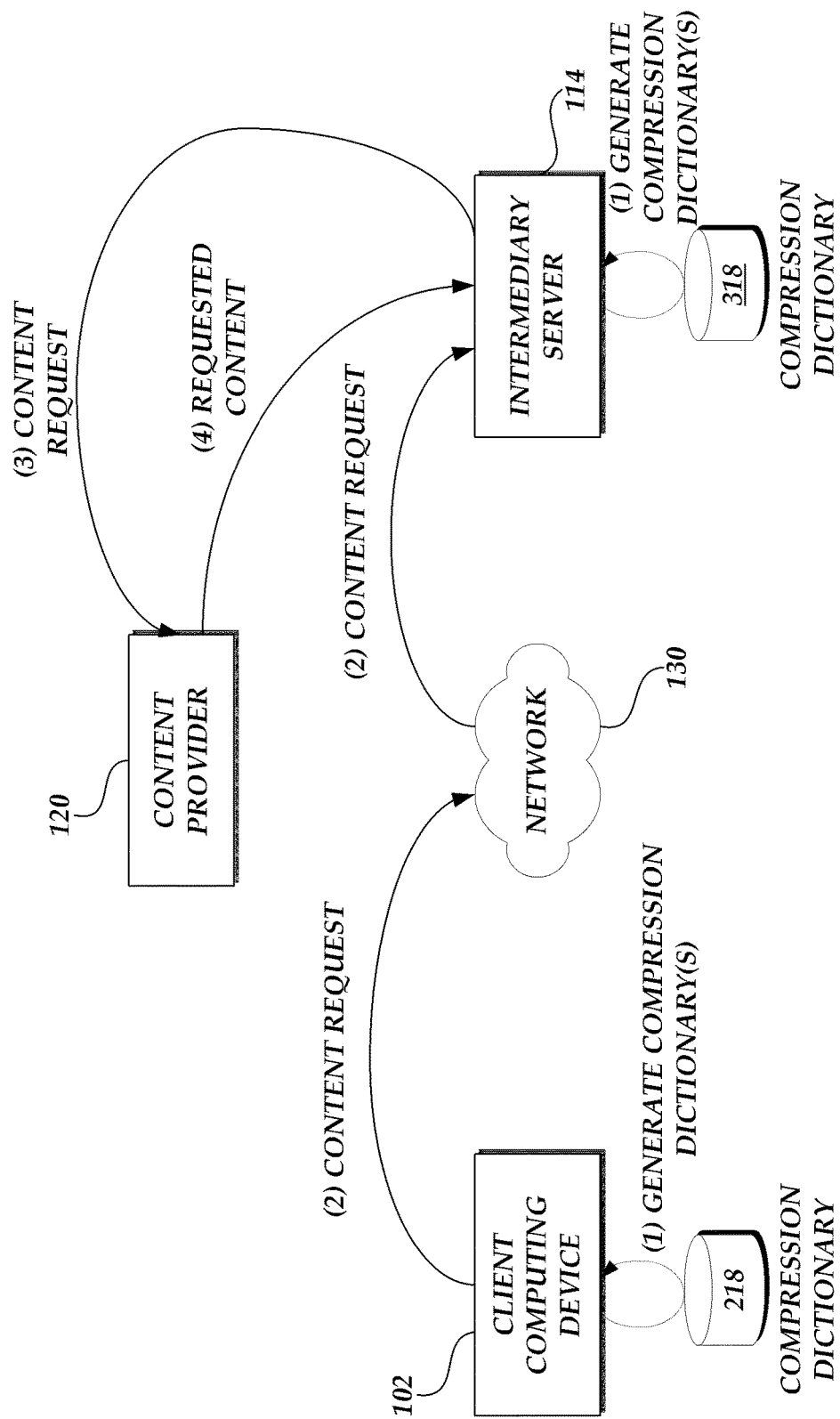
FIG. 4A is a block diagram of the communication management environment of FIG. 1 illustrating the interaction between the illustrated components in generating requests for content and the generation of compression dictionaries.

Turning now to FIGS. 4A-4D, illustrative interactions between the components of the content management system 110 to process content according to generated compression dictionaries will be described. More specifically, FIGS. 4A-4D will be described with regard to interactions between a client computing device 102, a content provider 120, and an intermediate computing device 114. Additionally, although depicted as a single interaction between a client computing device 102 and the intermediary server 114, in some embodiments, the intermediary server 114 can interact with a plurality of client computing devices 102 using the same compression dictionary and the same processes illustrated in FIGS. 4A-4D. With reference to FIG. 4A, in one embodiment, the process begins with the generation of compression dictionaries at the client computing device 102 and the intermediate computing device 114. In accordance with the present application, the client computing device 102 maintains a number of executable code segments in memory 210 (FIG. 2). The executable code segments correspond to various aspects of the operation of the client computing device 102, such as the operating system, software applications utilized in accordance with the present application (e.g., the compression application 218 or the browser application 216), or software applications not having any relationship with the present application, such as completely separate software application. The executable code segments are maintained in memory 210 in a form that can be read and executed by the processing unit 204. The executable code can be further organized or characterized into a number of fixed length blocks, such as 8 bit or 14 bits, corresponding to a serial order or sequential order of the executable code data. For example, if an executable code segment is organized into 8 bit fixed length blocks, the first block would correspond to the first 8 bits of the executable code segment, the second block would correspond to the next 8 bits of the executable code segment, and the like. Each identified block is then associated with one or more identifiers (including unique code block identifiers and location identifiers) that allows for the reference to specific fixed length code blocks or data chunks.

In a similar manner, the intermediary server 114 can be further configured to have a copy or access to a copy of the executable code segments maintained on the client computing device 102. For example, the intermediary server 114 can have access to executable code segments corresponding to the browser application 216 maintained by the client computing device 102. In one embodiment, the intermediary server 114 can include a virtualized representation of aspects of the client computing device 102 in which the intermediary server 114 is executing the same executable code segments as the client computing device. With reference to the previous example, in a further embodiment, the intermediary server 114 can execute the same executable code segment (e.g., browser application 316) corresponding to the browser application 216 in a manner that the client computing device 102 and intermediary server 114 browser applications have configurations in which the browser application communicate to obtain network resources, such as Web pages. An example of the configuration of browser applications between a client computing device 102 and an intermediary server 114 is described in commonly owned and co-pending application, U.S. patent application Ser. No. 13/174,589, filed on Jun. 30, 2011 and entitled "REMOTE BROWSING SESSION MANAGEMENT," which is incorporated by reference herein.

With reference to FIG. 4A, at (1), the client computing device 102 generates one or more compression dictionaries based on executable code segments maintained on the client computing device. Additionally, at (1), the intermediary server 114 also generates (or causes to be generated) one or more compression dictionaries based on executable code segments known to be maintained on the client computing device 102. Illustratively, the generation of the compression dictionaries can be done independently by the client computing device 102 and intermediary server 114. Additionally, the timing of the generation of the compression dictionary information can be based independently of a request to transmit information or processing information consistent in accordance with the present application. An illustrative routine for the generation of compression dictionary information will be described in greater detail below with regard to FIG. 6. The result of the generation of the compression dictionaries will be a set of identifiable fixed, length blocks of the executable code data for each identified executable code segment. In some embodiments, the client computing device 102 and intermediary server 114 can generate a single compression dictionary based on one or more executable code segments. In other embodiments, the client computing device 102 and intermediary server 114 can generate multiple compression dictionaries based on different executable code segments. For example, the client computing device 102 and intermediary server 114 can subdivide executable code to form multiple compression dictionaries. In other examples, the client computing device 102 and intermediary server 114 can generate multiple compression dictionaries based on different executable code.

In accordance with an embodiment illustrative with a content request example, at (2), the client computing device 102, through a browser application 216, can transmit a content request, such as a Web page request, to the intermediary server 114. The intermediary server 114 obtains the content request and processes the request. At (3), the intermediary server 114 transmits the request to a content server 120. The request can be considered an independent request from the intermediary server 114 or a pass through of the client computing device request. Responsive to the request, at (4) the content provider 120 can return the requested content. The requested content will be designated for return to the client computing device 102 by the intermediary server 114.

With reference now to FIG. 4B, after receiving the content, at (1), the intermediate server 114 identifies one of the compression dictionaries that are available. In some embodiments, the intermediate server 114 can utilize a single compression dictionary and attempt to compress all content according to the single compression dictionary. In other embodiments, the intermediate server 114 can utilize multiple compression dictionaries and utilize selection criteria to determine which compression dictionaries should be used. In one example, the intermediate server 114 can maintain meta-data that describes specifics characterizations or types of data that may be best applicable for certain compression dictionaries. In another example, the intermediate server 114 can utilize a random selection methodology or round-robin selection methodology for determining a compression dictionary to use. Additionally, although not illustrated in FIG. 4B, the intermediate server 114 can repeat the compression process using different compression dictionaries.

At (2), the intermediate server 114 begins processing the content to identify portions of the content that match one of the fixed length data chunks from the compression dictionary. Illustratively, any one of a number of search and matching algorithms may be utilized to compare the fixed length data chunks to the content. At (3), the intermediate server replaces any identified portions of the content with the identifiers from a corresponding fixed length data chunk from the compression dictionary. One skilled in the art will appreciate that the intermediate server 114 may conduct the matching prior to the replacement or alternatively match and replace sequentially. Additionally, it is assumed that the identifier utilized to replace the code is of a size less than the replaced code. At (4), the intermediate server 114 transmits the updated content (formed from the replaced matching data chunks) to the client computing device 102.

Once the updated content has been received at the client computing device 102, the client computing device 102 proceeds with de-compressing the content. At (5), the client computing device 102 identifies the compression dictionary that was used by the intermediate server 114. Illustratively, the transmission of the updated content from the intermediate server 114 can include the identifier of a specific set of compression dictionaries and an order of compression if multiple compression processing was conducted. In other embodiments, the client computing device 102 may have a schedule or a default compression dictionary and no identification is required. At (6), the client computing device 102 begins processing the content to identify any fixed data chunk identifiers in the content. At (7), the intermediate server replaces any identified identifiers with the corresponding portions of the content with the identifiers from a corresponding fixed length data chunk from the compression dictionary. One skilled in the art will appreciate that the client computing device 102 may conduct the matching prior to the replacement or alternatively match and replace sequentially. As described above, in embodiments in which multiple compression passes were conducted, the client computing device 102 would repeat the process.

Figure 4C:
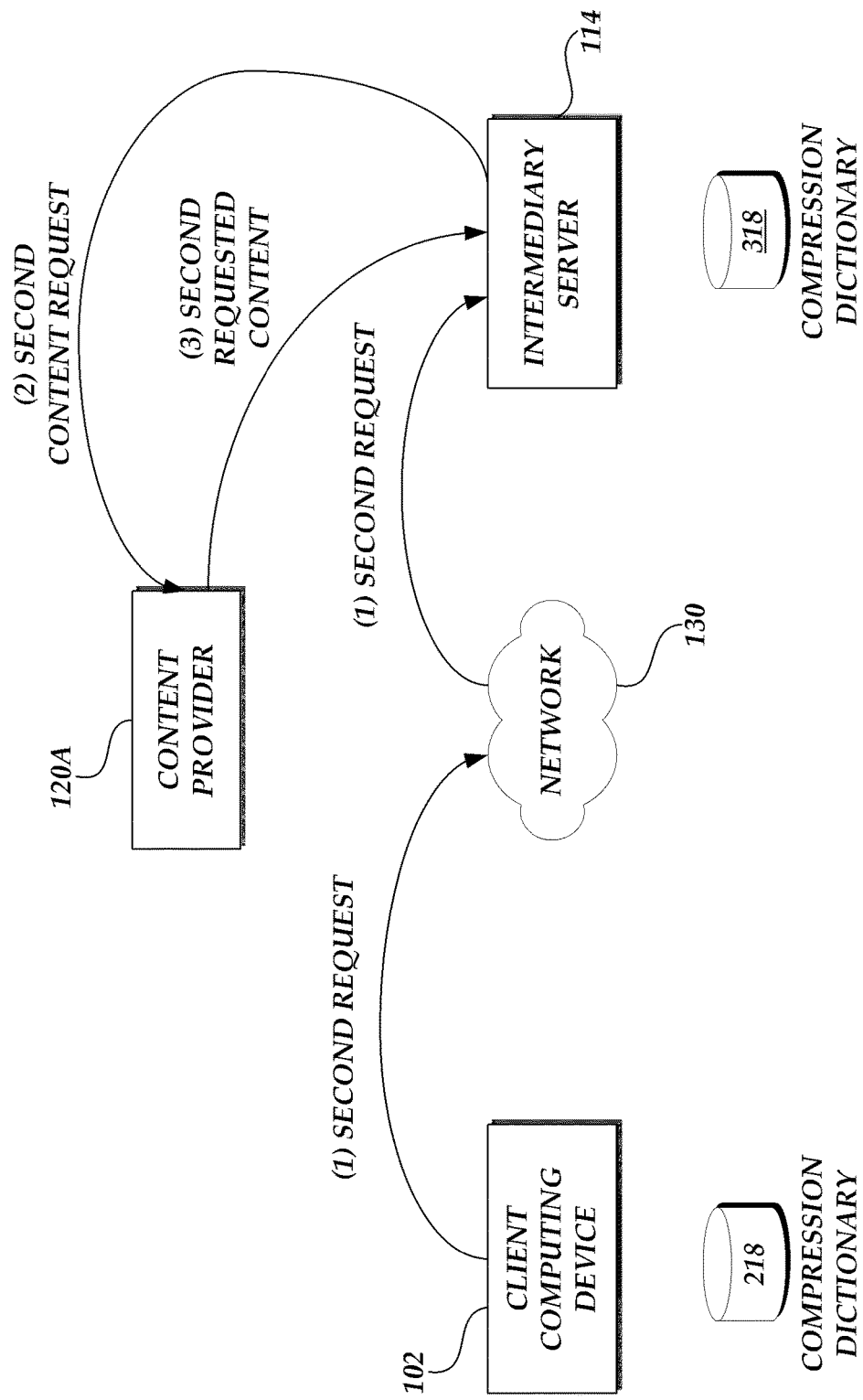
FIG. 4C is a block diagram of the communication management environment of FIG. 1 illustrating the interaction between the illustrated components in generating requests for content and the generation of compression dictionaries.

With reference to FIG. 4C, the exchange of information between the client computing device 102 and the intermediate server 114 can occur multiple times. At (1), the client computing device 102, through a browser application 216, can transmit a second content request, such as a Web page request, to the intermediary server 114. The intermediary server 114 obtains the second content request and processes the request. At (2), the intermediary server 114 transmits the second request to a second content server 120A. As described above, the request can be considered an independent request from the intermediary server 114 or a pass through of the client computing device request. Responsive to the second request, at (3) the second content provider 120A can return the requested second content. The requested second content will be designated for return to the client computing device 102 by the intermediary server 114. FIG. 4C can also be applicable to a second content request to the first content provider 120.

Figure 4D:
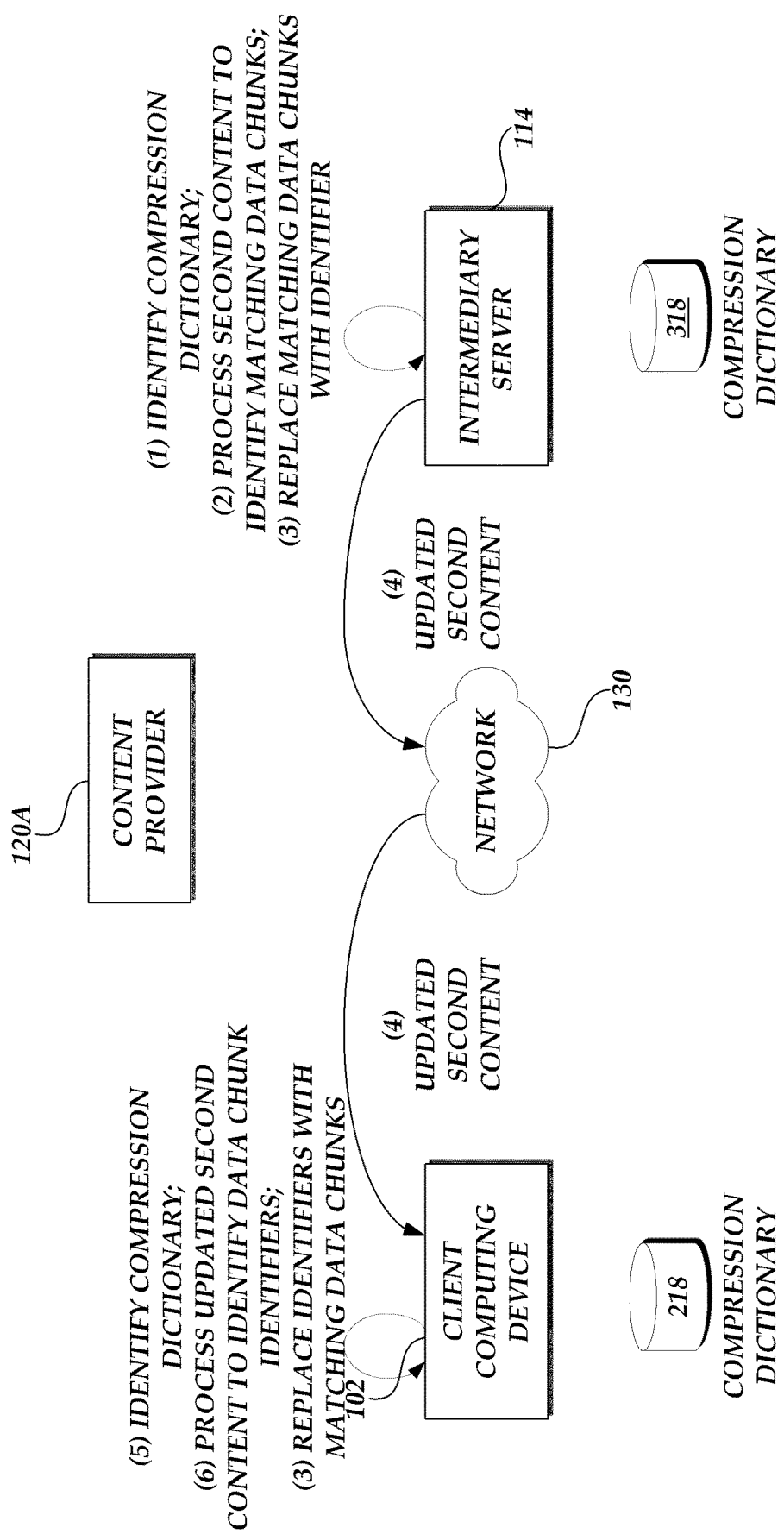
FIG. 4D is a block diagram of the communication management environment of FIG. 1 illustrating the interaction between the illustrated components for generating and processing compressed data in accordance with compression dictionaries

With reference now to FIG. 4D, after receiving the second content, at (1), the intermediate server 114 identifies one of the compression dictionaries that are available. As described previously, in some embodiments, the intermediate server 114 can utilize a single compression dictionary and attempt to compress all content according to the single compression dictionary. In other embodiments, the intermediate server 114 can utilize multiple compression dictionaries and utilize selection criteria to determine which compression dictionaries should be used. In one example, the intermediate server 114 can maintain meta-data that describes specifics characterizations or types of data that may be best applicable for certain compression dictionaries. In another example, the intermediate server 114 can utilize a random selection methodology or round-robin selection methodology for determining a compression dictionary to use. Additionally, although not illustrated in FIG. 4D, the intermediate server 114 can repeat the compression process using different compression dictionaries.

At (2), the intermediate server 114 begins processing the second content to identify portions of the second content that match one of the fixed length data chunks from the compression dictionary. Illustratively, any one of a number of search and matching algorithms may be utilized to compare the fixed length data chunks to the content. At (3), the intermediate server replaces any identified portions of the content with the identifiers from a corresponding fixed length data chunk from the compression dictionary. One skilled in the art will appreciate that the intermediate server 114 may conduct the matching prior to the replacement or alternatively match and replace sequentially. Additionally, it is assumed that the identifier utilized to replace the code is of a size less than the replaced code. At (4), the intermediate server 114 transmits the updated second content (formed from the replaced matching data chunks) to the client computing device 102.

Once the updated content has been received at the client computing device 102, the client computing device 102 proceeds with de-compressing the second content. At (5), the client computing device 102 identifies the compression dictionary that was used by the intermediate server 114. Illustratively, the transmission of the updated second content from the intermediate server 114 can include the identifier of a specific set of compression dictionaries and an order of compression if multiple compression processing was conducted. In other embodiments, the client computing device 102 may have a schedule or a default compression dictionary and no identification is required. Still further, once a communication session has begun, subsequent transmissions may be automatically configured to utilize the same compression dictionary.

At (6), the client computing device 102 begins processing the second content to identify any fixed data chunk identifiers in the content. At (7), the intermediate server replaces any identified identifiers with the corresponding portions of the content with the identifiers from a corresponding fixed length data chunk from the compression dictionary. One skilled in the art will appreciate that the client computing device 102 may conduct the matching prior to the replacement or alternatively match and replace sequentially. As described above, in embodiments in which multiple compression passes were conducted, the client computing device 102 would repeat the process.

Figure 5A:
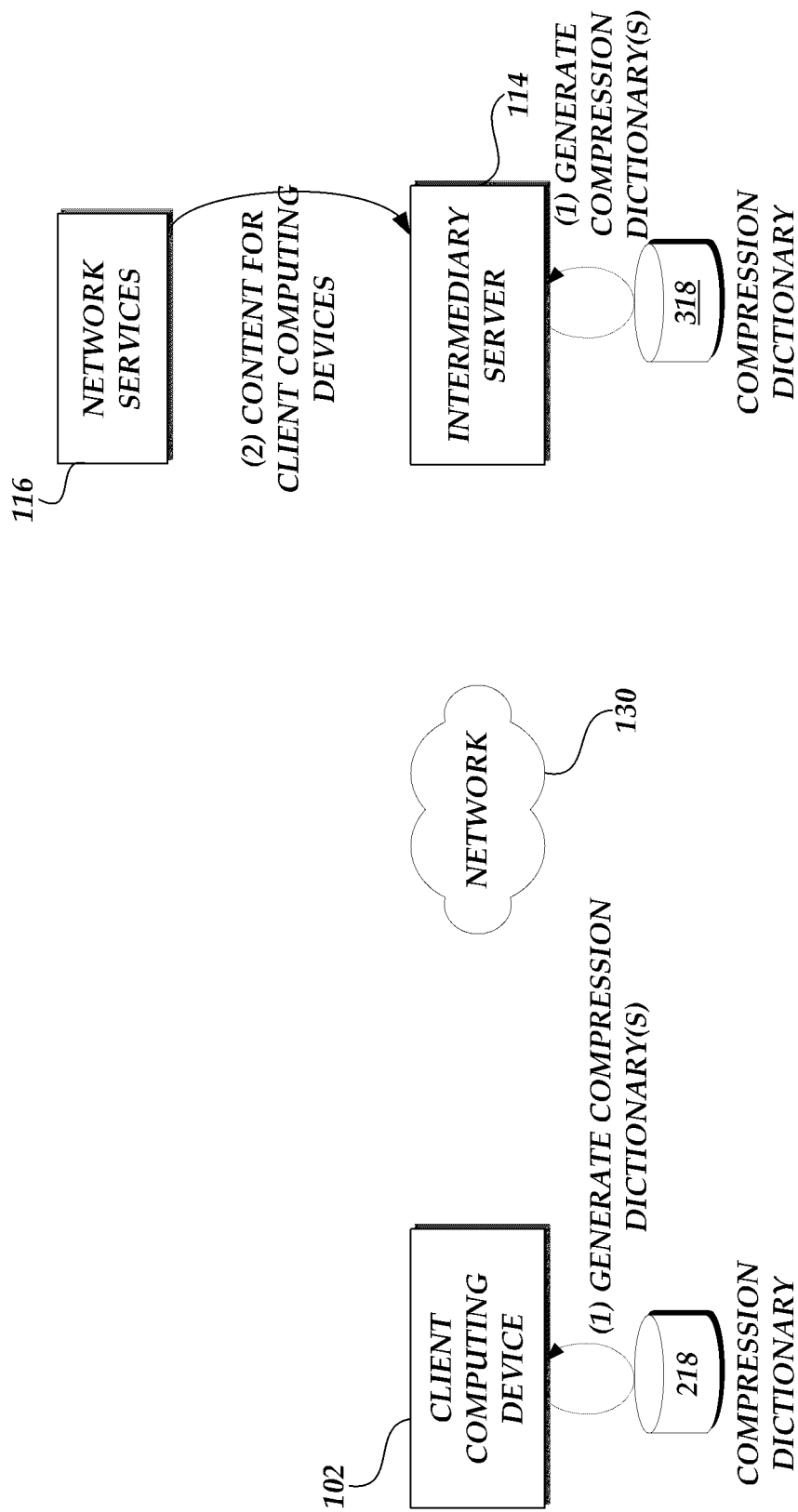
FIG. 5A is a block diagram of the communication management environment of FIG. 1 illustrating the interaction between the illustrated components in generating requests for content and the generation of compression dictionaries.
Figure 5B:
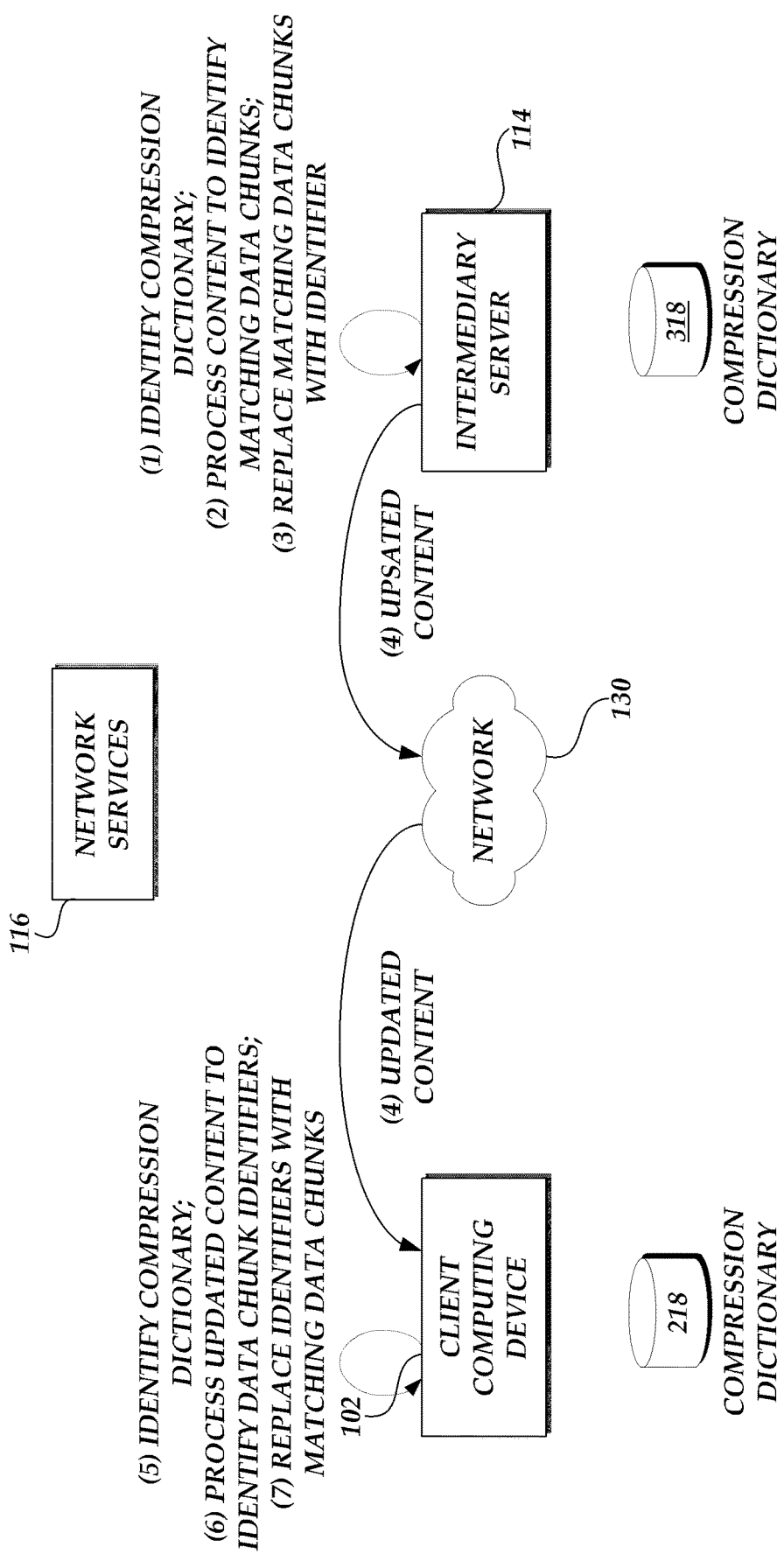
FIG. 5B is a block diagram of the communication management environment of FIG. 1 illustrating the interaction between the illustrated components for generating and processing compressed data in accordance with compression dictionaries.

Turning now to FIGS. 5A-5B, illustrative interactions between the components of the content management system 110 to process content according to generated compression dictionaries will be described. More specifically, FIGS. 5A-5B will be described with regard to interactions between a client computing device 102, a network service 116 and an intermediate computing device 114. In this embodiment, the network service 116 may be configured to provide information directly to the client computing device 102 without transmission of request, such as update information, push-type information and the like. Additionally, although depicted as a single interaction between a client computing device 102 and the intermediary server 114, in some embodiments, the intermediary server can interact with a plurality of client computing devices 102 using the same compression dictionary and the same processes illustrated in FIGS. 5A-5B.

With reference to FIG. 5A, at (1), the client computing device 102 generates one or more compression dictionaries based on executable code segments maintained on the client computing device. Additionally, at (1), the intermediate server 114 also generates (or causes to be generated) one or more compression dictionaries based on executable code segments known to be maintained on the client computing device 102. Illustratively, the generation of the compression dictionaries can be done independently by the client computing device 102 and intermediary server 114. Additionally, the timing of the generation of the compression dictionary information can be based independently of a request to transmit information or processing information compressed in accordance with the present application. An illustrative routine for the generation of compression dictionary information will be described in greater detail below with regard to FIG. 6. The result of the generation of the compression dictionaries will be a set of identifiable fixed, length blocks of the executable code data for each identified executable code segment. In some embodiments, the client computing device 102 and intermediary server 114 can generate a single compression dictionary based on one or more executable code segments. In other embodiments, the client computing device 102 and intermediary server 114 can generate multiple compression dictionaries based on different executable code segments. For example, the client computing device 102 and intermediary server 114 can subdivide executable code to form multiple compression dictionaries. In other examples, the client computing device 102 and intermediary server 114 can generate multiple compression dictionaries based on different executable code.

In accordance with an embodiment illustrative with a push example, at (2) the network service 116 provides content to the intermediate server 114. The content will be designated for return to the client computing device 102 by the intermediary server 114.

With reference now to FIG. 5B, after receiving the content, at (1), the intermediate server 114 identifies one of the compression dictionaries that are available. In some embodiments, the intermediate server 114 can utilize a single compression dictionary and attempt to compress all content according to the single compression dictionary. In other embodiments, the intermediate server 114 can utilize multiple compression dictionaries and utilize selection criteria to determine which compression dictionaries should be used. In one example, the intermediate server 114 can maintain meta-data that describes specifics characterizations or types of data that may be best applicable for certain compression dictionaries. In another example, the intermediate server 114 can utilize a random selection methodology or round-robin selection methodology for determining a compression dictionary to use. Additionally, although not illustrated in FIG. 4B, the intermediate server 114 can repeat the compression process using different compression dictionaries.

At (2), the intermediate server 114 begins processing the content to identify portions of the content that match one of the fixed length data chunks from the compression dictionary. Illustratively, any one of a number of search and matching algorithms may be utilized to compare the fixed length data chunks to the content. At (3), the intermediate server replaces any identified portions of the content with the identifiers from a corresponding fixed length data chunk from the compression dictionary. One skilled in the art will appreciate that the intermediate server 114 may conduct the matching prior to the replacement or alternatively match and replace sequentially. Additionally, it is assumed that the identifier utilized to replace the code is of a size less than the replaced code. At (4), the intermediate server 114 transmits the updated content (formed from the replaced matching data chunks) to the client computing device 102.

Once the updated content has been received at the client computing device 102, the client computing device 102 proceeds with de-compressing the content. At (5), the client computing device 102 identifies the compression dictionary that was used by the intermediate server 114. Illustratively, the transmission of the updated content from the intermediate server 114 can include the identifier of a specific set of compression dictionaries and an order of compression if multiple compression processing was conducted. In other embodiments, the client computing device 102 may have a schedule or a default compression dictionary and no identification is required. At (6), the client computing device 102 begins processing the content to identify any fixed data chunk identifiers in the content. At (7), the intermediate server replaces any identified identifiers with the corresponding portions of the content with the identifiers from a corresponding fixed length data chunk from the compression dictionary. One skilled in the art will appreciate that the client computing device 102 may conduct the matching prior to the replacement or alternatively match and replace sequentially. As described above, in embodiments in which multiple compression passes were conducted, the client computing device 102 would repeat the process.

FIG. 6 is a flow diagram illustrative of a compression dictionary generation routine 600 implemented by various components of the logical network 100 for generating compression dictionary. Illustratively, various components of the logical network 100, including the client computing devices 102 or the intermediary servers 114, may implement aspects of the routine 600. Accordingly, the routine 600 will be described generally with regard to a "computing device" to encompass all the potential components that may implement the routine. Illustratively, the generation of the compression dictionaries can be done independently by the client computing device 102 and intermediary server 114. Additionally, the timing of the generation of the compression dictionary information can be based independently of a request to transmit information or processing information compressed in accordance with the present application.

At block 602, the computing device obtains identifiable target data on the client computing device 102 that will form the basis of one or more compression dictionaries. In accordance with the present application, the client computing device 102 maintains a number of executable code segments in memory 210 (FIG. 2). The executable code segments correspond to various aspects of the operation of the client computing device 102, such as the operating system, software applications utilized in accordance with the present application (e.g., the compression application 218 or the browser application 216), or software applications not having any relationship with the present application. The executable code segments are maintained in memory 210 in a form that can be read and executed by the processing unit 204.

At block 604, the computing device processes the target data to generate fixed length data chunks or data blocks. The executable code can be further organized or characterized into a number of fixed length blocks, such as 8 bit or 14 bits, corresponding to a serial order or sequential order of the executable code data. For example, if an executable code segment is organized into 8 bit fixed length blocks, the first block would correspond to the first 8 bits of the executable code segment, the second block would correspond to the next 8 bits of the executable code segment, and the like. Each identified block is then associated with one or more identifiers (including unique code block identifiers and location identifiers) that allows for the reference to specific fixed length code blocks or data chunks.

At block 606, the computing device selects a set of the fixed length data chunks to form the compression dictionary. The result of the generation of the compression dictionaries will be a set of identifiable fixed, length blocks of the executable code data for each identified executable code segment. In some embodiments, the client computing device 102 and intermediary server 114 can generate a single compression dictionary based on one or more executable code segments. In other embodiments, the client computing device 102 and intermediary server 114 can generate multiple compression dictionaries based on different executable code segments. For example, the client computing device 102 and intermediary server 114 can subdivide executable code to form multiple compression dictionaries. In other examples, the client computing device 102 and intermediary server 114 can generate multiple compression dictionaries based on different executable code.

At block 608, the computing device 102 associates meta-data with the compression dictionary. In one aspect, the meta-data can include identifiers or other criteria that will be utilized by computing devices to identify which compression dictionary is being used. The identifiers can be local or globally unique identifiers. In another aspect, the compression dictionaries can also maintain information regarding a measured effectiveness or perceived effectiveness of the specific compression dictionary. For example, the compression dictionary may be associated with effectiveness determinations for certain types of data or data having identifiable characteristics. The meta-data can identify the particular type of data and provide known effectiveness statistics. The characterizations of the data into types can be based on sampling code segments, specific authors, an identification of libraries or compilers, and the like. In another example, the compression dictionary may be associated with effectiveness determinations for certain sources of data, such as particular content providers 120, network service providers 116, and the like. The meta-data can identify the particular type of source and provide known effectiveness statistics. In some embodiments, a measured or associated effectiveness may not be known upon the first generation of the compression dictionary. Accordingly, the computing device 102 may calculate or receive effectiveness data that can be added to the meta-data. For example, the computing device may maintain ongoing compression data that is updated with every compression attempt.

In other embodiments, the meta-data can also include additional information that can be useful in the selection of a particular compression dictionary or in the execution of the compression dictionary. For example, the meta-data can include financial cost information that can associate a financial costs to the resources consumed in the compression process or resources save by the compression process. This form of meta-data would allow the computing devices to maintain a cost calculation or to other publish costs information. In another example, the meta-data can include a count related to a number of times a particular compression dictionary is used. This form of meta-data would allow the computing devices to assist in round robin selection, report usage information or normalize effectiveness information (e.g., allow for weighted averages of effectiveness for more heavily used compression dictionaries). One skilled in the relevant art will appreciate that additional or alternative meta-data may also be utilized.

At block 610, the routine 600 terminates and the compression dictionary can be stored for use in compression and de-compression routines.

Figure 7:
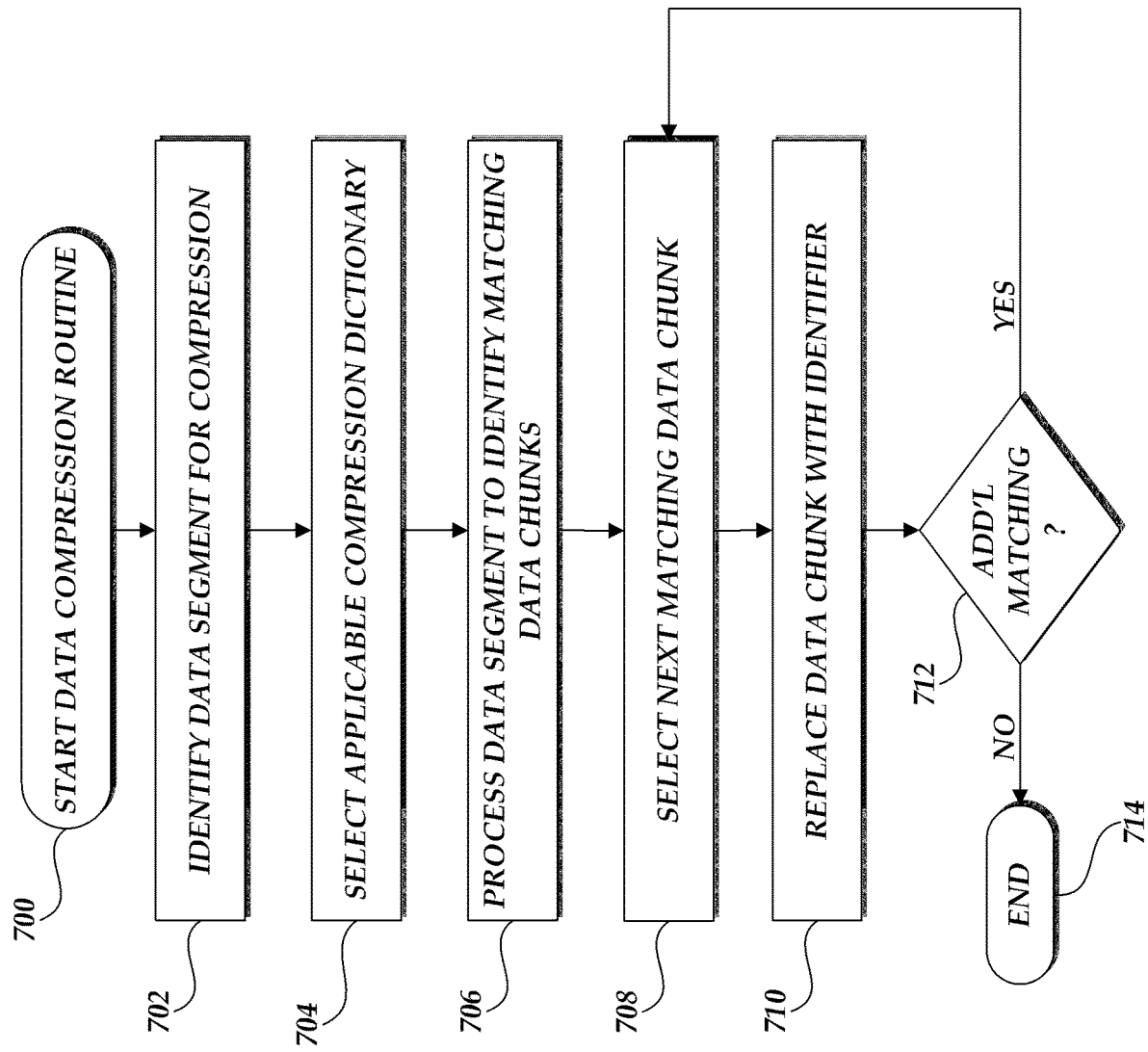
FIG. 7 is a flow diagram illustrative of a data compression routine implemented by an intermediate computing device of the communication management system.

FIG. 7 is a flow diagram illustrative of a data compression routine implemented by an intermediate computing device of the content management system 110. For purposes of illustration, routine 700 will be described with regard to implementation by intermediary server 114. However, other components of the content management system 110 may implement the routine.

At block 702, the intermediate server 114 identifies the data segment that will be compressed. This can be performed on an individual content basis or batch basis. At block 704, the intermediary server 114 identifies one of the compression dictionaries that are available. As previously described, the intermediate server 114 can utilize a single compression dictionary and attempt to compress all content according to the single compression dictionary. In other embodiments, the intermediate server 114 can utilize multiple compression dictionaries and utilize selection criteria to determine which compression dictionaries should be used. In one example, the intermediate server 114 can maintain meta-data that describes specifics characterizations or types of data that may be best applicable for certain compression dictionaries. In another example, the intermediate server 114 can utilize a random selection methodology or round-robin selection methodology for determining a compression dictionary to use. Additionally, although not illustrated in FIG. 4B, the intermediate server 114 can repeat the compression process using different compression dictionaries.

At block 706, the intermediate server 114 begins processing the content to identify portions of the content that match one of the fixed length data chunks from the compression dictionary. Illustratively, any one of a number of search and matching algorithms may be utilized to compare the fixed length data chunks to the content. At block 708, the intermediary server 114 enters into a loop for processing the identified matching blocks by selecting the next matching block. At block 710, the intermediate server replaces any identified portions of the content with the identifiers from a corresponding fixed length data chunk from the compression dictionary. One skilled in the art will appreciate that the intermediate server 114 may conduct the matching prior to the replacement or alternatively match and replace sequentially. Additionally, it is assumed that the identifier utilized to replace the code is of a size less than the replaced code. At decision block 712, a test is conducted to determine whether additional matching data blocks exist. If so, the routine 700 returns to block 708 to select the next matching data block. Alternatively, if all the matching data blocks have been processed, the routine 700 terminates at block 714. As described previously, routine 700 can be repeated multiple times to allow for compression of the content according to multiple compression dictionaries.

Figure 8:
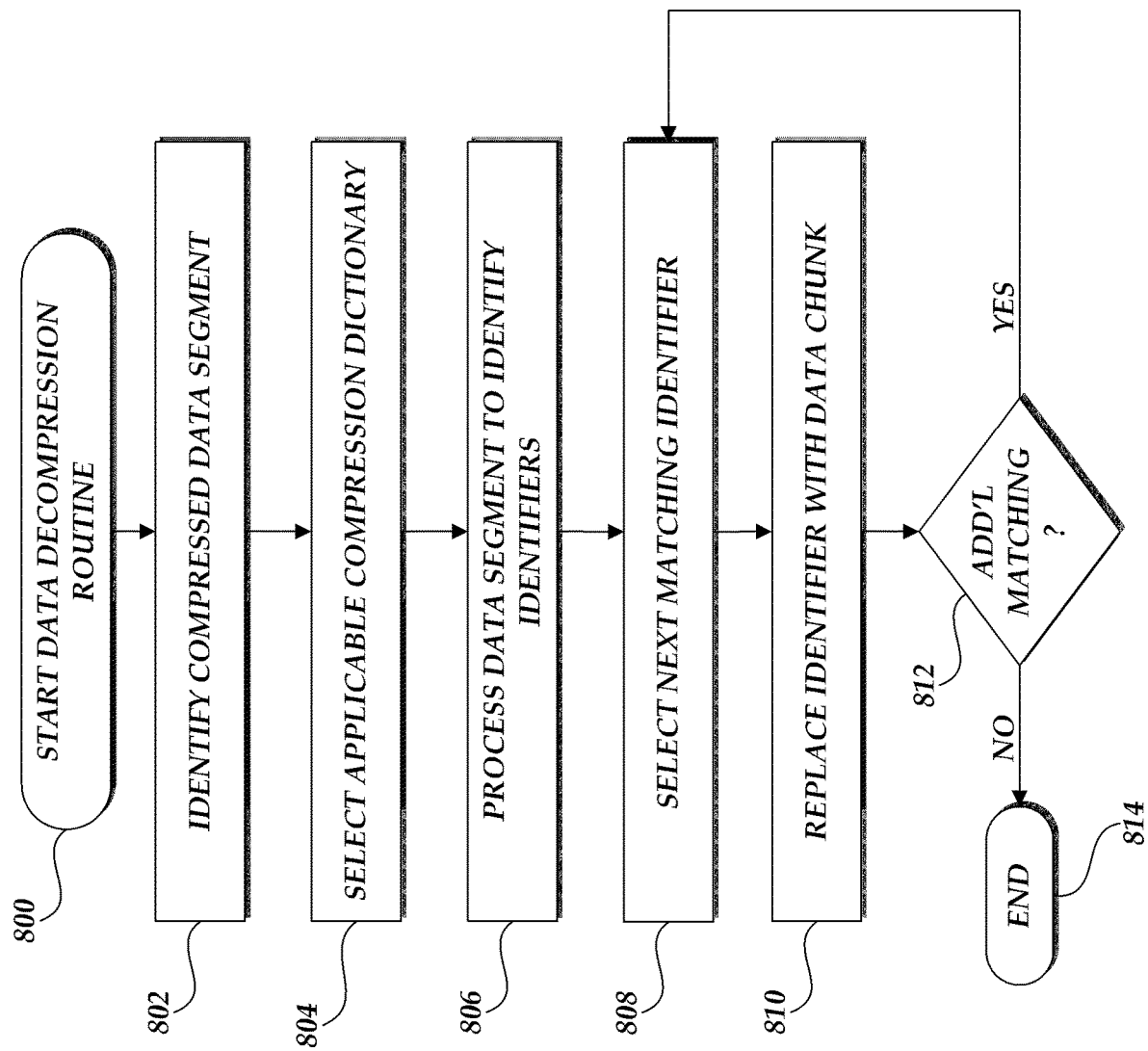
FIG. 8 is a flow diagram illustrative of a data decompression routine implemented by a client computing device of the communication management system.

FIG. 8 is a flow diagram illustrative of a data de-compression routine implemented by a client computing device of the communication management system 110. For purposes of illustration, routine 700 will be described with regard to implementation by a client computing device 102. However, other components of the communication management system 100 may implement the routine. Once the updated content has been received at the client computing device 102, the client computing device 102 proceeds with de-compressing the content at block 802 by identifying the content to be de-compressed. At block 804, the client computing device 102 identifies the compression dictionary that was used by the intermediate server 114. Illustratively, the transmission of the updated content from the intermediate server 114 can include the identifier of a specific set of compression dictionaries and an order of compression if multiple compression processing was conducted. In other embodiments, the client computing device 102 may have a schedule or a default compression dictionary and no identification is required.

At block 806, the client computing device 102 begins processing the content to identify any fixed data chunk identifiers in the content. At block 808, the client computing device 102 enters into a loop to process all the matching identifiers by selecting the next identifier. At block 810 the intermediate server replaces any identified identifiers with the corresponding portions of the content with the identifiers from a corresponding fixed length data chunk from the compression dictionary. At decision block 812, a test is conducted to determine whether additional matching identifiers exist. If so, the routine 800 returns to block 808 to select the next matching identifier. Alternatively, if all the matching identifiers have been processed, the routine 800 terminates at block 814. As described previously, routine 800 can be repeated multiple times to allow for compression of the content according to multiple compression dictionaries.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of managing data transmissions to client computing devices utilizing executable-based compression dictionaries, the method comprising:

determining, by an intermediary device, that one or more client computing devices maintain executable code organized into a plurality of identifiable fixed length data chunks;

generating, by the intermediary device, a compression dictionary made up of a set of the plurality of identifiable fixed length data chunks of executable code corresponding to the executable code maintained on the one or more client computing devices;

obtaining, by the intermediary device, a data request from a client computing device of the one or more client computing devices, the data request corresponding to a request for content from a content provider;

transmitting, by the intermediary device, a data request to the content provider;

obtaining, by the intermediary device, data from the content provider;

processing, by the intermediary device, the data from the content provider to identify one or more portions of the data from the content provider matching identifiable fixed length data chunks defined in the generated compression dictionary;

replacing, by the intermediary device, the identified one or more portions of the data from the content provider with identifiers representative of a matched fixed length data chunk defined in the generated compression dictionary to form updated content from the content provider; and transmitting, by the intermediary device, the updated content from the content provider to the client computing device, wherein the generated compression dictionary is not transmitted to the client computing device, and wherein transmitting the updated content to the client computing device causes the client computing device to obtain the data from the content provider by replacing identifiers in the updated content with identifiable fixed length data chunks of the executable code maintained on the one or more client computing devices.

2. The method as recited in claim 1, wherein each of the identifiers representative of a matched data chunk is associated with a location of a fixed length data chunk in the executable code.

3. The method as recited in claim 1 further comprising transmitting, by the intermediary device, information identifying the executable code associated with the generated compression dictionary.

4. The method as recited in claim 1 further comprising:
obtaining, by the intermediary device, a second data request from the client computing device, the second data request corresponding to a request for content from a second content provider;

transmitting, by the intermediary device, the second data request to the second content provider;

obtaining, by the intermediary device, second data from the second content provider;

processing, by the intermediary device, the second data from the second content provider to identify one or more portions of the second data from the second content provider matching identifiable fixed length data chunks defined in the generated compression dictionary;

replacing, by the intermediary device, the identified one or more portions of the second data from the second content provider with identifiers representative of a matched data chunk defined in the generated compression dictionary to form updated second data from the second content provider; and transmitting, by the intermediary device, the updated second data from the second content provider to the client computing device without transmitting the generated compression dictionary.

5. A system for managing data transmissions to client computing devices utilizing compression dictionaries comprising:
a plurality of client computing devices, wherein each of the plurality of client computing devices is configured to receive content;

an intermediary device including at least one processor and computer-executable instructions that, when executed by the at least one processor, cause the intermediary device to:

obtain data to be transmitted to at least one client computing device of the plurality of client computing devices;

determine that the at least one client computing device maintains executable code organized into a set of identifiable data chunks;

process the data to be transmitted to the at least one client computing device to identify one or more portions of the data matching identifiable data chunks defined in a generated compression dictionary, wherein the generated compression dictionary corresponds to the set of identifiable data chunks included in the executable code maintained by the at least one client computing device;

replace the identified one or more portions of the data to be transmitted to the at least one client computing device with identifiers representative of a matched data chunk defined in the generated compression dictionary to form updated data to be transmitted to the at least one client computing device; and transmit the updated data to the at least one client computing device, wherein the generated compression dictionary is not transmitted to the at least one client computing device, and wherein the at least one client computing device replaces at least one identifier in the updated data with an identifiable data chunk of the executable code.

6. The system as recited in claim 5, wherein the computer-executable instructions, when executed by the at least one processor, cause the intermediary device to:
obtain the executable code maintained by the at least one client computing device; and generate the compression dictionary from the set of identifiable data chunks included in the executable code.

7. The system as recited in claim 5, wherein the computer-executable instructions, when executed by the processor, cause the intermediary device to:
obtain a content request from the at least one client computing device, wherein the content request corresponds to a request for content from a content provider; and transmit a request to the content provider responsive to the obtained content request from the at least one client computing device.

8. The system as recited in claim 7, wherein the content request from the at least one client computing device corresponds to a request for a network resource.

9. The system as recited in claim 5, wherein the intermediary device processes the data to be transmitted to the at least one client computing device to identify the one or more portions of the data matching identifiable data chunks defined in a generated compression dictionary by selecting one of a plurality of compression dictionaries, wherein each of the plurality of compression dictionaries is based on executable code maintained on the plurality of client computing devices.

10. The system as recited in claim 9 including further computer-executable instructions that, when executed by the at least one processor, cause the intermediary device to:
identify a type of content to be transmitted; and select one of a plurality of compression dictionaries based on association of one or more compression dictionaries to the type of content to be transmitted.

11. The system as recited in claim 9 including further computer-executable instructions that, when executed by the at least one processor, cause the intermediary device to:

identify a type of content to be transmitted; and filter one of a plurality of compression dictionaries based on association of one or more compression dictionaries to the type of content to be transmitted.

12. The system as recited in claim 11, wherein the intermediary device filters one of the plurality of compression dictionaries as not meeting criteria associated with the type of content to be transmitted.

13. The system as recited in claim 5 including further computer-executable instructions that, when executed by the at least one processor, cause the intermediary device to:

process the updated data to be transmitted to the at least one client computing device to identify one or more portions of the data matching identifiable data chunks defined in a second generated compression dictionary, wherein the second generated compression dictionary corresponds to a set of identifiable data chunks included in second executable code maintained by the at least one client computing device; and replace the identified one or more portions of the updated data to be transmitted to the at least one client computing device with identifiers representative of a matched data chunk defined in the second generated compression dictionary to form second updated data to be transmitted to the at least one client computing device;

wherein the intermediary device transmits the updated data to the at least one client computing device by transmitting the second updated data to the at least one client computing device.

14. The system as recited in claim 5, wherein the intermediary device obtains data to be transmitted to the plurality of client computing devices, wherein the intermediary device processes the data to be transmitted to the plurality of the client computing devices to identify one or more portions of the data to be transmitted to the plurality of client computing devices matching identifiable data chunks defined in the generated compression dictionary, and wherein the generated compression dictionary corresponds to a set of identifiable data chunks included in executable code maintained by the plurality of the client computing devices.

15. A non-transitory computer readable medium storing computer-executable instructions for managing data transmissions to client computing devices utilizing compression dictionaries, wherein the computer-executable instructions, when executed by an intermediary device including a processor and memory, cause the intermediary device to:

process data to be transmitted to at least one client computing device to identify one or more portions of the data matching identifiable data chunks defined in a generated compression dictionary, wherein the generated compression dictionary corresponds to a set of identifiable fixed length data chunks included in executable code determined to be maintained by the at least one client computing device;

replace the identified one or more portions of the data with identifiers representative of a matched data chunk defined in the generated compression dictionary to form updated data to be transmitted to the at least one client computing device; and transmit the updated data to the at least one client computing device, wherein the generated compression dictionary is not transmitted to the at least one client computing device, and wherein the at least one client computing device replaces at least one identifier in the updated data with an identifiable fixed length data chunk of the executable code.

16. The non-transitory computer readable medium as recited in claim 15 storing further computer-executable instructions that, when executed by the intermediary device, cause the intermediary device to:

obtain the executable code maintained by the at least one client computing device; and generate the compression dictionary from the set of identifiable fixed length data chunks included in the executable code.

17. The non-transitory computer readable medium as recited in claim 15 storing further computer-executable instructions that, when executed by the intermediary device, cause the intermediary device to:

obtain a content request from the at least one client computing device, wherein the content request corresponds to a request for content from a content provider; and transmit a request to the content provider responsive to the obtained content request from the at least one client computing device.

18. The non-transitory computer readable medium as recited in claim 15, wherein the intermediary device selects one of a plurality of compression dictionaries, wherein each of the compression dictionaries is based on executable code maintained on the at least one client computing device.

19. The non-transitory computer readable medium as recited in claim 15 storing further computer-executable instructions that, when executed by the intermediary device, cause the intermediary device to:

obtain second data to be transmitted to the at least one client computing device;

process the second data to identify one or more portions of the second data matching identifiable fixed length data chunks defined in the generated compression dictionary;

replace the identified one or more portions of the second data with identifiers representative of a matched data chunk defined in the generated compression dictionary to form updated second data; and transmit the updated second data to the client computing device without transmitting the generated compression dictionary.

20. The non-transitory computer readable medium as recited in claim 15, wherein the data to be transmitted correspond to executable code.

* * * * *